No. 667,424. Patented Feb. 5, 1901.
W. CARR.
SHAFT COUPLING.
(Application filed Oct. 23, 1900.)

(No Model.)

Witnesses.
Wallace S. Moyle.
Florence H. Mark.

Inventor.
William Carr
by George E. Hall
Attorney.

UNITED STATES PATENT OFFICE.

WILLIAM CARR, OF NEW HAVEN, CONNECTICUT, ASSIGNOR OF ONE-HALF TO JAMES CARR, OF SAME PLACE.

SHAFT-COUPLING.

SPECIFICATION forming part of Letters Patent No. 667,424, dated February 5, 1901.

Application filed October 23, 1900. Serial No. 34,066. (No model.)

*To all whom it may concern:*

Be it known that I, WILLIAM CARR, a citizen of the United States, residing at New Haven, in the county of New Haven and State of Connecticut, have invented certain new and useful Improvements in Shaft-Couplings, of which the following is a specification, reference being had therein to the accompanying drawings.

My invention relates to improvements in shaft-couplings, and has for its object, among other things, the construction of a device that will be simple in operation and which will effectively secure the two pieces of shaft together and so designed as to be produced at the minimum cost of manufacture.

To these and other ends my invention consists in the shaft-coupling having certain details of construction and combination of parts, as will be hereinafter described, and more particularly pointed out in the claims.

Figure 1:
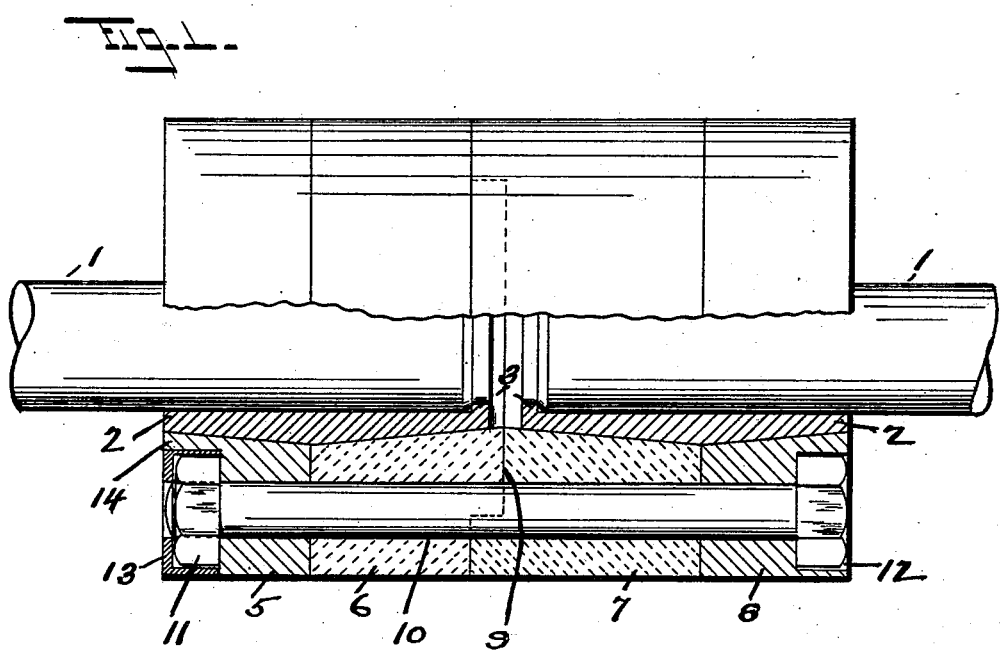
Figure 2:
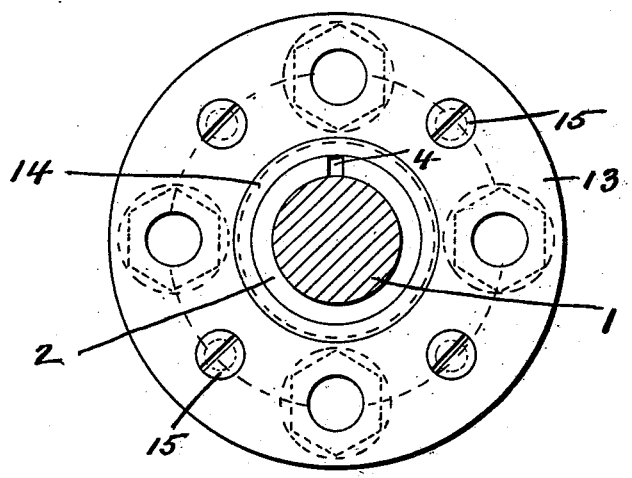

Referring to the drawings, in which like numerals designate like parts in both views, Figure 1 is a side elevation of the coupling with the lower portion thereof broken away, and Fig. 2 is an end view thereof looking toward the left end of the coupling in Fig. 1.

My invention consists, essentially, in two split sleeves or bushings having a bore of substantially the same diameter as the shaft, which bushings are placed upon the shaft and surrounded by outer rings, which when drawn toward each other compress the said bushings and grip the shafts, thereby holding the same by frictional contact against movement.

In the drawings, the numeral 1 designates the shafts, and 2 the bushings or sleeves, which have a straight bore for substantially the whole of their length and an inwardly-turned lip 3 at their inner ends and with a slot 4 extending longitudinally therethrough. The bushings 2 are provided with a tapered exterior, having the largest diameter in the middle and tapering toward their opposite ends, as shown in Fig. 1. Surrounding these bushings are the clamp-rings 5, 6, 7, and 8, each of the said rings having a conical bore corresponding to the taper of the bushings 2. The clamp-ring 6 is provided with a central boss 9, which enters a recess in the inner face of the ring 7 to provide a convenient means for holding the rings against lateral movement in relation to each other. All of the clamp-rings are secured together by means of a plurality of bolts 10, preferably four in number, the body of the said bolts passing through each of the said rings and having a nut 11 upon one end. I prefer to conceal the bolt-heads in the recesses 12 in the face of the clamp-ring 8, as shown in Fig. 1, and to conceal the nuts 11 by a collar 13, which is recessed to receive the nuts 11 and fitted upon a shoulder 14, formed upon the ring 5, it being held against outward movement by means of a plurality of screws 15, threaded into the ring 5 and with their heads flush with the face of said collar. It is apparent that by this construction all of the rings will be secured together rigidly and that by tightening the nuts 11 upon the bolts 10 they will be drawn toward each other and each one of the rings will assist in compressing the split bushings 2, which bushings will then grip the shafts tightly. I prefer to provide the lips 3 upon the inner ends of the bushings 2 to form a stop for the shafts when inserted therein; but I do not limit myself, however, to this construction, as they can be made with a straight bore throughout, if necessary.

The coupling can be used for any size shafting, it being necessary only to vary the size of the bore of the bushings.

There are minor changes and alterations that can be made within my invention aside from those herein suggested, and I would therefore have it understood that I do not limit myself to the exact construction herein shown and described, but claim all that falls fairly within the spirit and scope of my invention.

Having described my invention, what I claim as new is—

1. The herein-described shaft-coupling, comprising two split friction-bushings each having a tapered exterior; a plurality of outer rings surrounding the said bushings; and means for securing the said rings together, substantially as described.

2. In a shaft-coupling, the combination with a pair of split bushings lying end to end, each having an exterior tapering from the center toward either end; of clamp-rings surrounding each of said bushings, the bores of which have substantially the same taper as the taper upon said bushings; and means for drawing the said clamp-rings together, whereby a compression force is exerted upon the said bushings, substantially as described.

3. In a shaft-coupling, the combination with a pair of split bushings each having an exterior tapering from the center toward each end; of a plurality of clamp-rings surrounding each of said bushings; and clamp-bolts passing through the said clamp-rings and adapted to hold the said rings together, substantially as described.

4. In a shaft-coupling, the combination with the pair of split bushings 2 placed end to end; of the clamp-rings 5, 6, 7 and 8 surrounding the said bushings; and the clamp-bolts 10 passing through the said clamp-rings and having the nuts 11 threaded thereon, substantially as described.

5. In a shaft-coupling, the combination with the split bushings 2; of the clamp-rings 5, 6, 7 and 8 surrounding the said bushings; clamp-bolts 10 passing through the said clamp-rings and having the nuts 11 threaded thereon; and the cap 13 secured to one of said rings and adapted to conceal the said nuts, substantially as described.

In testimony whereof I affix my signature in presence of two witnesses.

WILLIAM CARR.

Witnesses:
GEORGE E. HALL,
FLORENCE H. MONK.